United States Patent
Tajima et al.

(10) Patent No.: US 8,222,851 B2
(45) Date of Patent: Jul. 17, 2012

(54) MACHINE CONTROL DEVICE

(75) Inventors: Hirokazu Tajima, Suzuka (JP); Takayuki Kaneko, Kodaira (JP)

(73) Assignee: Fuji Electric Co., Ltd. (JP)

( * ) Notice: Subject to any disclaimer, the term of this patent is extended or adjusted under 35 U.S.C. 154(b) by 375 days.

(21) Appl. No.: 12/550,836

(22) Filed: Aug. 31, 2009

(65) Prior Publication Data

US 2010/0052594 A1 Mar. 4, 2010

(30) Foreign Application Priority Data

Aug. 29, 2008 (JP) ................................. 2008-221281

(51) Int. Cl.
*G05B 5/01* (2006.01)

(52) U.S. Cl. ........ 318/619; 318/611; 318/560; 318/609; 318/610

(58) Field of Classification Search .................. 318/619, 318/611, 560, 609, 610
See application file for complete search history.

(56) References Cited

U.S. PATENT DOCUMENTS

| | | | | |
|---|---|---|---|---|
| 5,475,291 A | * | 12/1995 | Yoshida et al. | 318/568.22 |
| 5,952,804 A | * | 9/1999 | Hamamura et al. | 318/560 |
| 6,252,369 B1 | * | 6/2001 | Kaku et al. | 318/609 |
| 6,936,990 B2 | * | 8/2005 | Oyama et al. | 318/632 |
| 6,943,522 B2 | * | 9/2005 | Nagaoka et al. | 318/632 |

FOREIGN PATENT DOCUMENTS

| | | |
|---|---|---|
| EP | 1 847 892 A2 | 10/2007 |
| GB | 483635 A | 4/1938 |
| JP | 61-139808 A | 6/1986 |
| JP | 04-283807 A | 10/1992 |
| JP | 10-097323 A | 4/1998 |
| JP | 2002-150732 A | 5/2002 |
| JP | 2003-076426 | 3/2003 |

OTHER PUBLICATIONS

Extended European Search Report issued in corresponding European Patent Application No. 09167932.4 dated Jan. 5, 2010.

* cited by examiner

*Primary Examiner* — Walter Benson
*Assistant Examiner* — David Luo
(74) *Attorney, Agent, or Firm* — Rossi, Kimms & McDowell LLP

(57) ABSTRACT

A machine control device has a position regulator configured to enable modification of the proportional gain during regulation operations, and has proportional gain setting unit, which sends an instruction to modify the proportional gain to the position regulator based on a position instruction value which is an output of a position instruction unit. In the proportional gain setting unit, when the movement velocity based on the position instruction value from the position instruction unit decreases, that is, when the position instruction value is a value at which the movement distance is short, the proportional gain of the position regulator is set high, and when the movement velocity based on the position instruction value increases, that is, when the position instruction value is a value at which the movement distance is long, the proportional gain is set low.

4 Claims, 12 Drawing Sheets

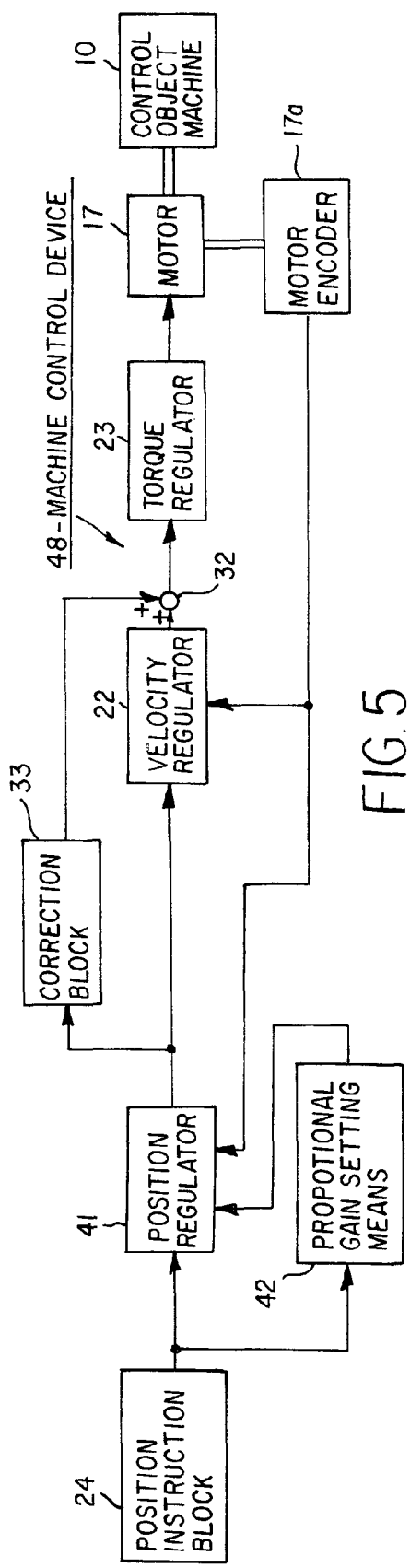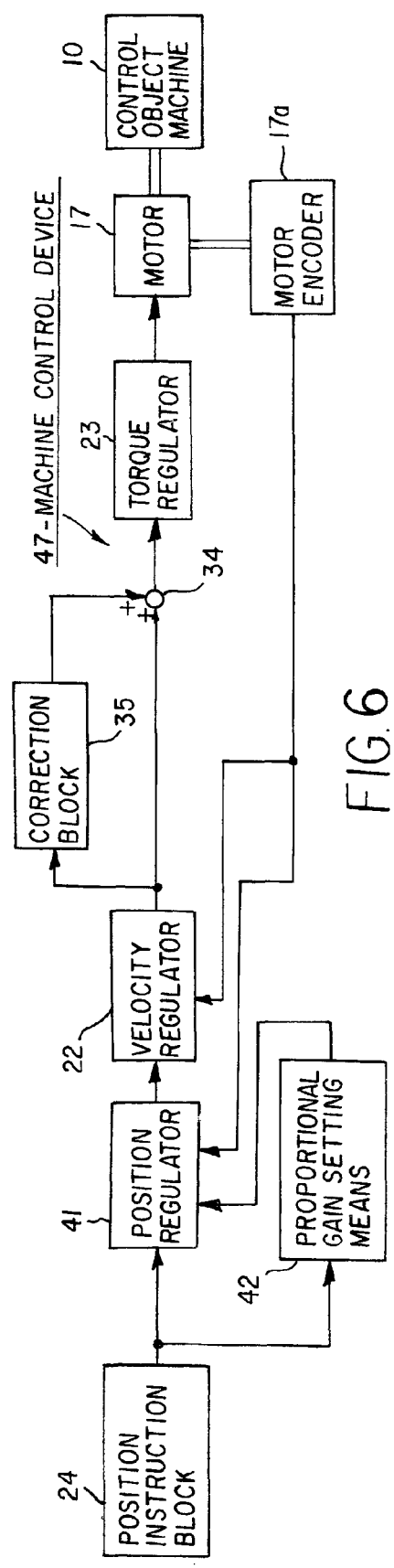

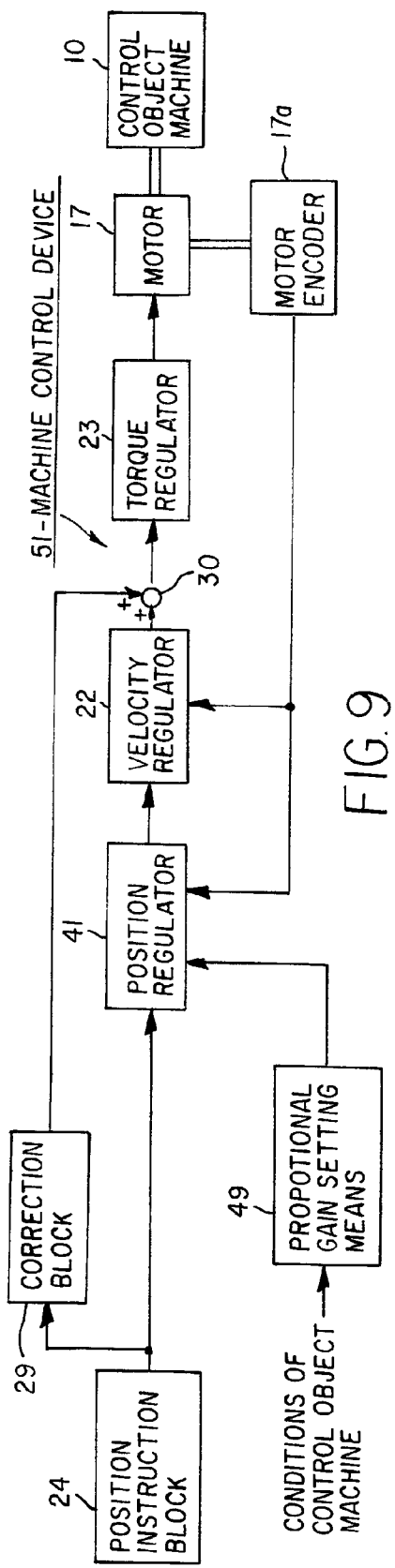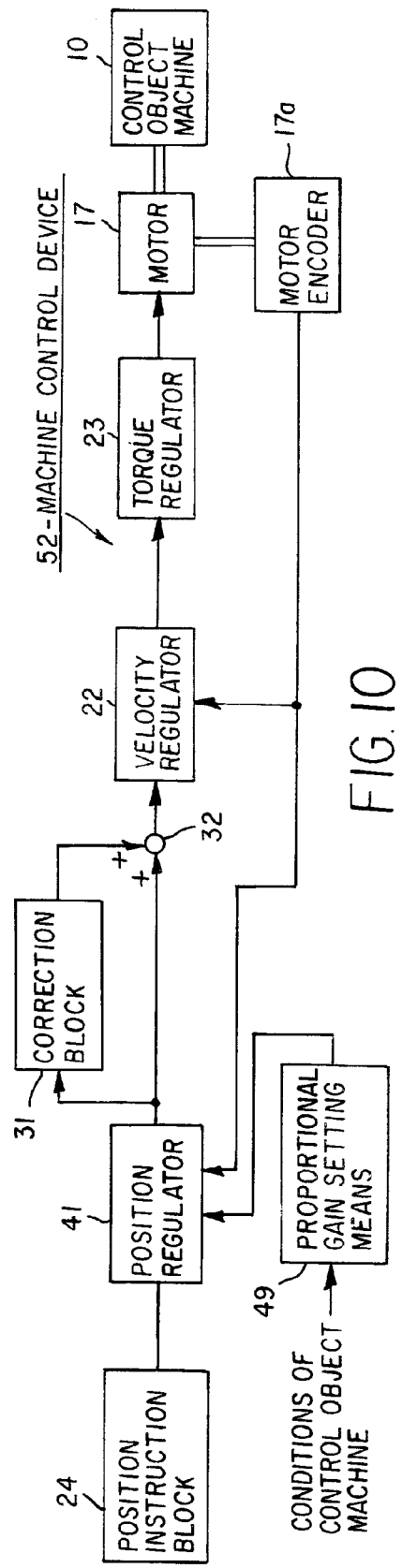
FIG. 9
FIG. 10

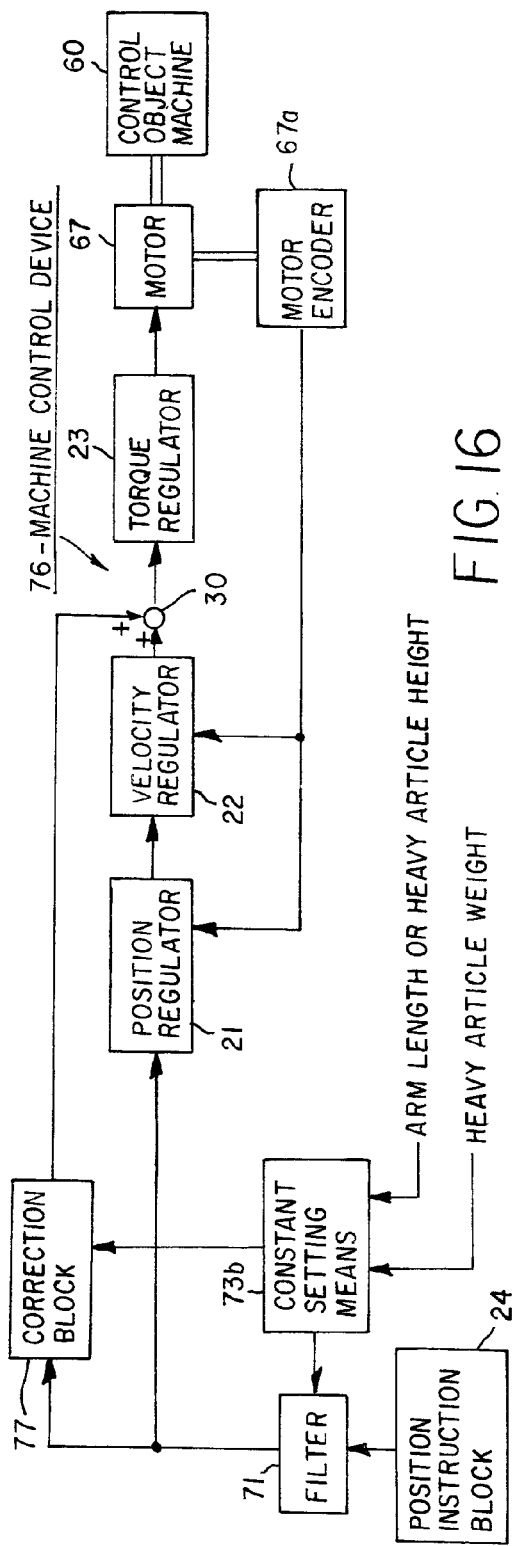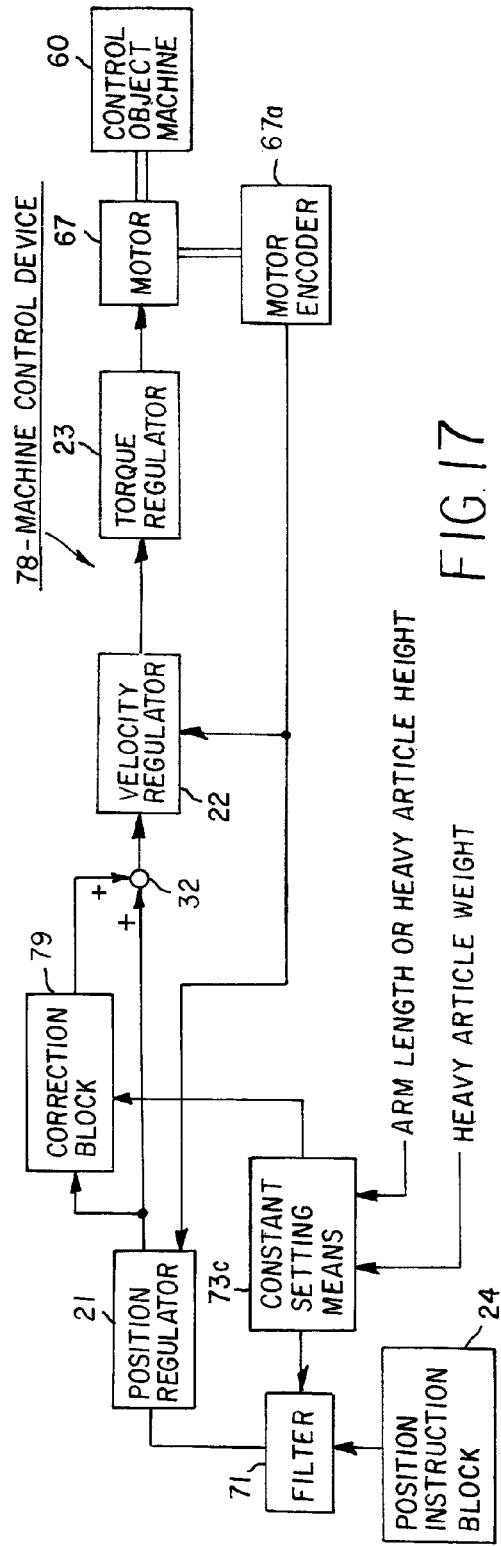

MACHINE CONTROL DEVICE

BACKGROUND OF THE INVENTION

The present invention relates to a machine control device to move a control object machine to a target position and halt the machine, and relates to a machine control device which suppresses vibration of the control object machine due to inertial forces at the time of halting.

FIG. 20 is a schematic conceptual diagram of a control object machine. The machine 10 includes a heavy article 11, arm 12, sliding movement portion 13, slide rail portion 14, feed screw 15, coupling 16, motor 17, and any one of the machine control devices 20, 40, 43 to 48, and 50 to 54. Of these, the control object machine comprises the heavy article 11, arm 12, sliding movement portion 13, slide rail portion 14, feed screw 15, and coupling 16.

In FIG. 20, the slide rail portion 14 constrains the sliding movement portion 13 to move only in the right-left movement directions in the figure. And, the contact portions of the slide rail portion 14 and the sliding movement portion 13 have low friction, so that the sliding movement portion 13 can move smoothly over the slide rail portion 14. The output shaft of the motor 17 is connected to the feed screw 15 via the coupling 16, and this feed screw 15 is screwed into a screw interior, not shown, mounted on the sliding movement portion 13. That is, through rotational driving of the feed screw 15 by the motor 17, the sliding movement portion 13 moves in the right and left directions in the figure according to position control operation by the machine control device.

A long arm 12 is mounted on the sliding movement portion 13 which is positioned-controlled in this way, and a heavy article 11 is mounted on the end of this arm 12. Hence through position control of the sliding movement portion 13, the position of the heavy article 11 at the end of the arm 12 is also controlled.

For the configuration shown in FIG. 20, it is known that even when the sliding movement portion 13 is halted at the target position, the heavy article 11 at the end of the arm 12 causes the arm 12 to flex due to its own inertial force, advancing further than the instructed position, so that halting may not be immediate and vibration may occur even after the sliding movement portion 13 has halted at the target position.

FIG. 21 shows the circuit configuration of a conventional machine control device 20 including functions to suppress the above-described vibration phenomenon; this circuit configuration is disclosed in Japanese Patent Application Laid-open No. 2003-76426. The machine control device 20 comprises a position regulator 21, velocity regulator 22, torque regulator 23, position instruction unit 24, correction unit 25, and adder 26.

In FIG. 21, in the position regulator 21, a regulation operation is performed such that the position detection value from a motor encoder 17a mounted on the motor 17 matches the position instruction value of an instruction; the output is sent as a velocity instruction value to the velocity regulator 22. In the velocity regulator 22, a regulation operation is performed such that the velocity detection value from the motor encoder 17a matches the velocity instruction value; the output is sent as a torque instruction value to the torque regulator 23.

In the torque regulator 23, control is executed to drive the motor 17 according to the torque instruction value, via an inverter incorporated within the torque regulator 23, to move the sliding movement portion 13 of the machine 10 to a prescribed position, and to halt the machine.

In the position instruction unit 24, a position instruction value is output to move the sliding movement portion 13 to the target position; in the correction unit 25, the second derivative value of the position instruction value (the acceleration instruction value) is multiplied by a prescribed gain to determine a correction amount, and this correction amount is added to the position instruction value by the adder 26; the addition value is sent to the position regulator 21 as the new position instruction value.

That is, in the machine control device 20 shown in FIG. 21, a transfer function based on the above-described correction unit 25 and adder 26 acts so as to cancel the vibration element component of the transfer function derived from the spring constant of the arm 12 and the mass of the heavy article 11, so as to suppress the above-described vibration phenomenon in the control object machine.

In the conventional machine control device 20 shown in FIG. 21, in order to quicken the response to a position instruction value, the proportional gain must be further increased in regulating operation of the position regulator 21; but when an abrupt disturbing torque occurs in the control object machine or at other times, if the proportional gain is made too great, there is the problem that vibration phenomena of the control object machine cannot be adequately suppressed.

Further, when the arm of the control object machine is long and the rigidity thereof is low, or when the heavy article is heavy and the position thereof is high, there has been the problem that in the circuit configuration of the conventional machine control device 20, vibration phenomena of the control object machine cannot adequately be suppressed.

In view of the above, it would be desirable to provide a machine control device which resolves the above-described problem.

SUMMARY OF THE INVENTION

The invention provides a machine control device including correction unit for obtaining a correction amount, based on an instruction value for any one of position, velocity and torque, from the nth derivative value (where n is a natural number equal to or greater than 2) of the instruction value, addition unit for add the correction amount to an instruction value for any one of position, velocity and torque, and control unit for driving and controlling the control object machine according to output of the addition unit, the machine control device further having proportional gain setting unit for setting a proportional gain, upon position regulation operation.

The invention further provides that, in the proportional gain setting unit, when a movement velocity based on the position instruction value decreases the proportional gain is set high, and when a movement velocity based on the position instruction value increases the proportional gain is set low.

Still further, the invention provides that, in the proportional gain setting unit, under conditions where abrupt disturbing torques occur to the control object machine, proportional gain is set low, and under conditions where abrupt disturbing torques do not occur to the control object machine the proportional gain is set high.

In addition, the invention provides a machine control device including correction unit for obtaining a correction amount, based on an instruction value for any one of position, velocity and torque, from the nth derivative value (where n is a natural number equal to or greater than 2) of the instruction value, addition unit for adding the correction amount to an instruction value for any one of position, velocity and torque, and control unit for driving and controlling the control object machine according to output of the addition unit, the machine control device, further having: a filter for performing filter processing to the position instruction value, the output value from this filter is taken as a new position instruction value, and constant setting unit for setting time constant of the filter and the correction gain of the correction unit.

The invention further provides that, in the constant settings unit, when the weight of a heavy article mounted on the control object machine is greater than a prescribed value and the length of an arm supporting the heavy article is greater than a prescribed value or the heavy article is at a high position, the time constant of the filter is set high, and when the weight of the heavy article is smaller than the prescribed value and the length of the arm supporting the heavy article is smaller than a prescribed value or the heavy article is at a low position, the time constant of the filter is set low.

Still further, the invention provides that, in the constant settings unit, when the weight of a heavy article mounted on the control object is greater than a prescribed value and the length of an arm supporting the heavy object is greater than a prescribed value or the heavy article is at a high position, the correction gain of the correction unit is set high, and when the weight of the heavy article is smaller than the prescribed value and the length of the arm supporting the heavy article is smaller than a prescribed value or the heavy article is at a low position, the correction gain of the correction unit is set low.

By unit of the invention, a configuration is employed in which the proportional gain of position regulation operations in the machine control device can be varied, so that vibration phenomena of the control object machine can be suppressed, while ensuring rapid response. Further, by employing a configuration in which the position instruction value is subjected to filter processing, and the time constant in this processing as well as the correction gain of the correction unit can be varied, vibration phenomena of the control object machine can be effectively suppressed.

Further advantages, objects, features and embodiments of the invention will become apparent from the following detailed description of the preferred embodiments of the invention.

BRIEF DESCRIPTION OF THE DRAWINGS

The invention will be described with reference to certain preferred embodiments thereof and the accompanying drawings, wherein:

FIG. 5 is a circuit configuration diagram of a machine control device, showing a fifth embodiment of the invention;

FIG. 6 is a circuit configuration diagram of a machine control device, showing a sixth embodiment of the invention;

FIG. 9 is a circuit configuration diagram of a machine control device, showing a ninth embodiment of the invention;

FIG. 10 is a circuit configuration diagram of a machine control device, showing a tenth embodiment of the invention;

FIG. 16 is a circuit configuration diagram of a machine control device, showing a fifteenth embodiment of the invention;

FIG. 17 is a circuit configuration diagram of a machine control device, showing a sixteenth embodiment of the invention;

DETAILED DESCRIPTION OF THE PREFERRED EMBODIMENTS

Figure 1:
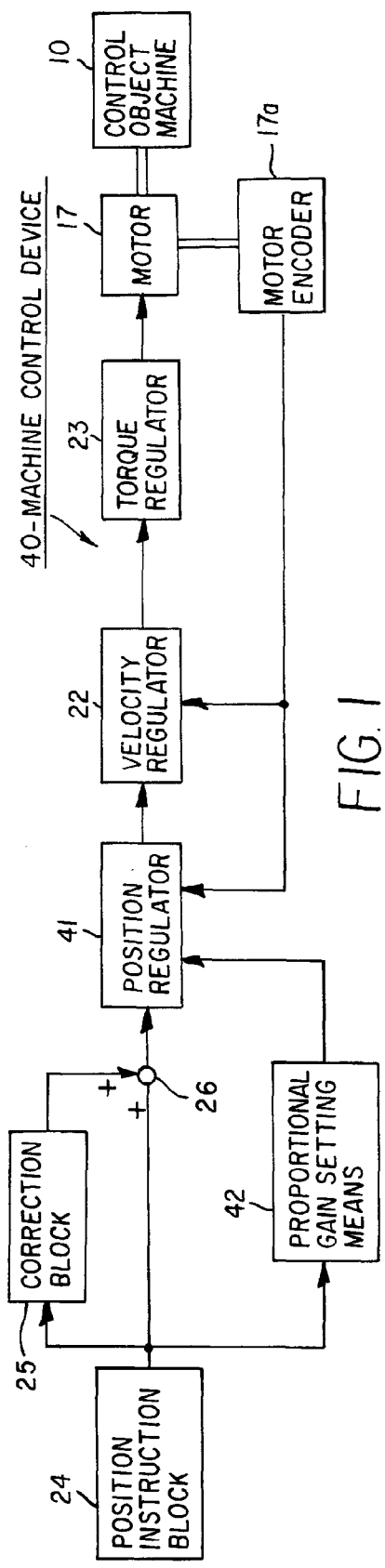
FIG. 1 is a circuit configuration diagram of a machine control device, showing a first embodiment of the invention.
Figure 21:
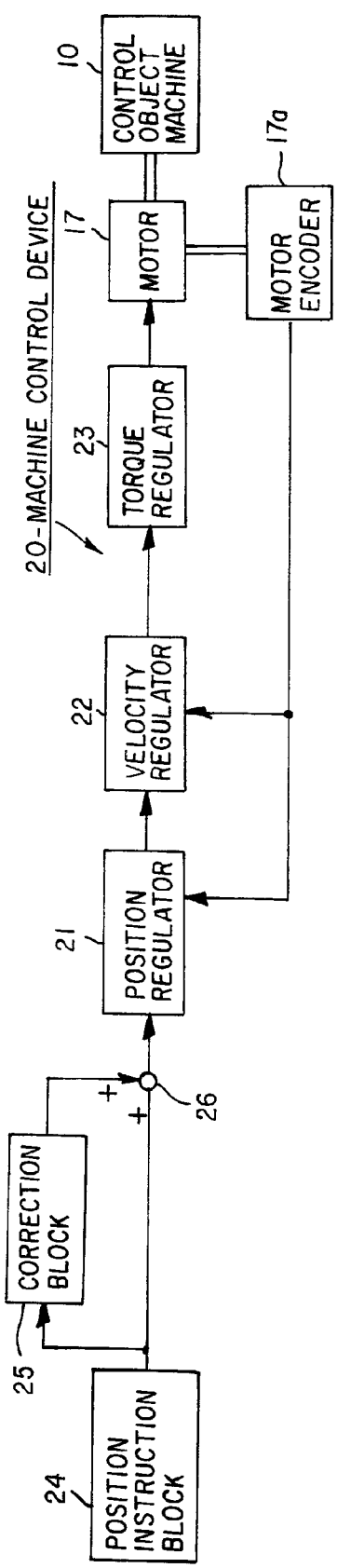
FIG. 21 is a circuit configuration diagram of a machine control device showing an example of the prior art.

FIG. 1 is a circuit configuration diagram of a machine control device, showing a first embodiment of the invention; portions which have the same functions as in the machine control device of the prior art shown in FIG. 21 are assigned the same symbols, and explanations thereof are omitted.

The machine control device 40 shown in FIG. 1 differs from the conventional machine control device 20 in that, in place of a position regulator 21 with a fixed proportional gain during regulation operations, a position regulator 41 with a variable proportional gain during regulation operations is comprised; further, this machine control device 40 comprises proportional gain setting unit 42, which issues an instruction to change the proportional gain of the position regulator 41 based on a position instruction value which is output from the position instruction unit 24.

In this proportional gain setting unit 42, when the movement velocity of the sliding movement portion 13 (see FIG. 20) based on the position instruction value from the position instruction unit 24 is slow, that is, when the position instruction value results in a short movement distance, the proportional gain of the position regulator 41 is set high, and when the movement velocity based on the position instruction value is fast, that is, when the position instruction value results in a long movement distance, the proportional gain is set low.

As a result, in a control object machine using this machine control device 40, the performance of position control can be improved while suppressing arm vibration phenomena arising from a high proportional gain.

Figure 2:
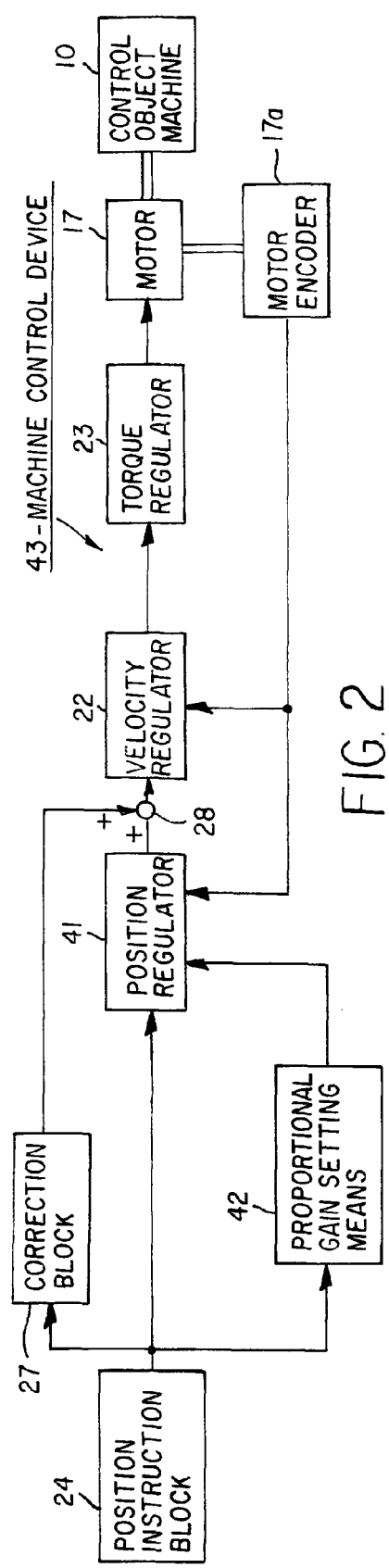
FIG. 2 is a circuit configuration diagram of a machine control device, showing a second embodiment of the invention.

FIG. 2 is a circuit configuration diagram of a machine control device, showing a second embodiment of the invention; portions which have the same functions as in the machine control device shown in FIG. 1 are assigned the same symbols.

That is, the machine control device 43 shown in FIG. 2 differs from the machine control device 40 in that, in place of the correction unit 25, a correction unit 27 is comprised, and an adder 28 is further comprised; in addition, the adder 26 is omitted.

In this correction unit 27, the third derivative value of the position instruction value (a jerk instruction value) is multiplied by a prescribed gain to determine a correction amount, this correction amount is added to the velocity instruction value which is the output of the position regulator 41 by the adder 28, and the addition value is sent to the velocity regulator 22 as a new velocity instruction value.

That is, in the machine control device 43 shown in FIG. 2, the transfer function based on the above-described correction unit 27 and adder 28 acts so as to cancel the vibration element component of the transfer function derived from the spring constant of the arm 12 and the weight of the heavy article 11, so that the above-described vibration phenomena of the control object machine are suppressed.

Further, in the proportional gain setting unit 42, when the movement velocity of the sliding movement portion 13 (see FIG. 20) is slow based on the position instruction value from the position instruction unit 24, that is, when the position instruction value is such that the movement distance is short, the proportional gain of the position regulator 41 is set high, and when the movement velocity based on the position instruction value is fast, that is, when the position instruction value is such that the movement distance is long, the proportional gain is set low.

As a result, in the control object machine using this machine control device 43, the position control performance can be improved while suppressing arm vibration phenomena arising from a high proportional gain.

Figure 3:
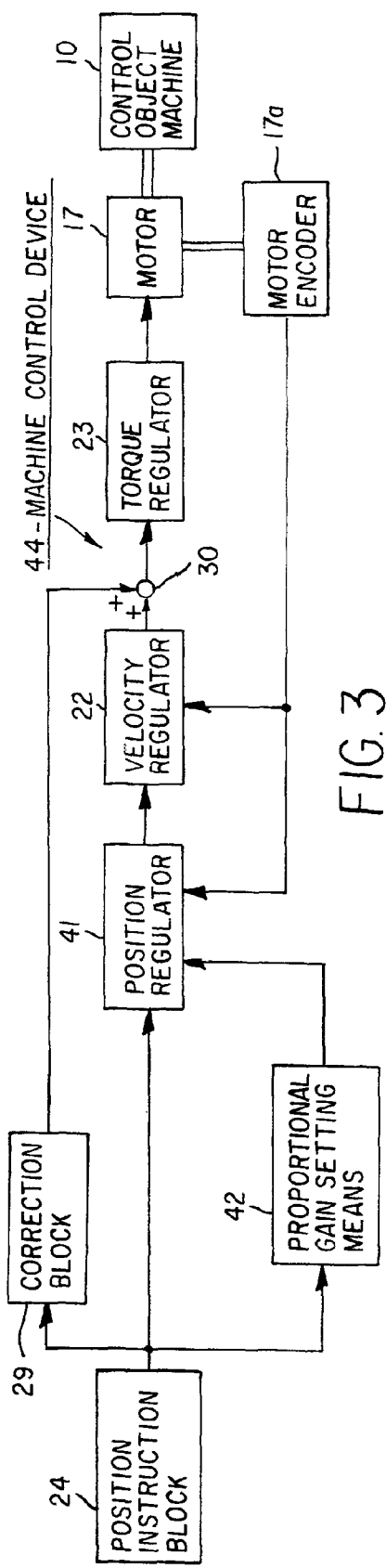
FIG. 3 is a circuit configuration diagram of a machine control device, showing a third embodiment of the invention.

FIG. 3 is a circuit configuration diagram of a machine control device, showing a third embodiment of the invention; portions which have the same functions as in the machine control device shown in FIG. 1 are assigned the same symbols.

That is, the machine control device 44 shown in FIG. 3 is different from the machine control device 40 in that, in place of the correction unit 25, a correction unit 29 is comprised, and an adder 30 is comprised; in addition, the adder 26 is omitted.

In this correction unit 29, the fourth derivative value of the position instruction value is multiplied by a prescribed gain to determine a correction amount, and this correction amount is added to a torque instruction value which is the output of the velocity regulator 22 by the adder 30; this addition value is sent to the torque regulator 23 as a new torque instruction value.

That is, in the machine control device 44 shown in FIG. 3, the transfer function based on the above-described correction unit 29 and adder 30 acts so as to cancel the vibration element component of the transfer function derived from the spring constant of the arm 12 and the weight of the heavy article 11, so that the above-described vibration phenomena of the control object machine are suppressed.

Further, in the proportional gain setting unit 42, when the movement velocity of the sliding movement portion 13 (see FIG. 20) based on the position instruction value from the position instruction unit 24 is slow, that is, when the position instruction value is such that the movement distance is short, the proportional gain of the position regulator 41 is set high, and when the movement velocity based on the position instruction value is fast, that is, when the position instruction value is such that the movement distance is long, the proportional gain is set low.

As a result, in the control object machine using this machine control device 44, the position control performance can be improved while suppressing arm vibration phenomena arising from a high proportional gain.

Figure 4:
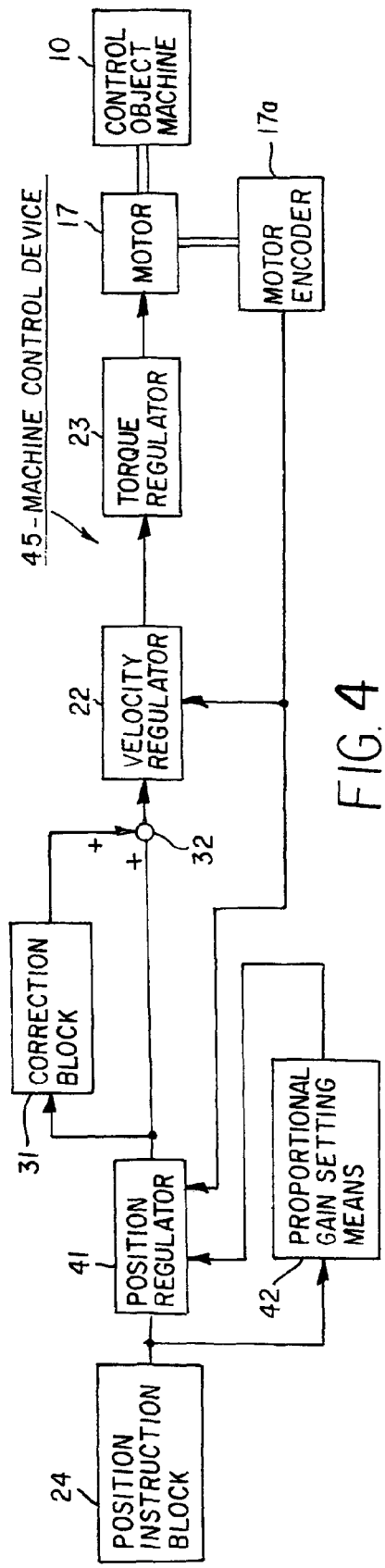
FIG. 4 is a circuit configuration diagram of a machine control device, showing a fourth embodiment of the invention.

FIG. 4 is a circuit configuration diagram of a machine control device, showing a fourth embodiment of the invention; portions which have the same functions as in the machine control device shown in FIG. 1 are assigned the same symbols.

That is, the machine control device 45 shown in FIG. 4 is different from the machine control device 40 in that, in place of the correction unit 25, a correction unit 31 is comprised, and in addition an adder 32 is comprised, and the adder 26 is omitted.

In this correction unit 31, the second derivative value of the velocity instruction value (an acceleration instruction value) which is the output of the position regulator 41 is multiplied by a prescribed gain to determine a correction amount, and this correction amount is added to the velocity instruction value by the adder 32; this addition value is sent to the velocity regulator 22 as a new velocity instruction value.

That is, in the machine control device 45 shown in FIG. 2, the transfer function based on the above-described correction unit 31 and adder 32 acts so as to cancel the vibration element component of the transfer function derived from the spring constant of the arm 12 and the weight of the heavy article 11, so that the above-described vibration phenomena of the control object machine are suppressed.

Further, in the proportional gain setting unit 42, when the movement velocity of the sliding movement portion 13 (see FIG. 20) based on the position instruction value from the position instruction unit 24 is slow, that is, when the position instruction value is such that the movement distance is short, the proportional gain of the position regulator 41 is set high, and when the movement velocity based on the position instruction value is fast, that is, when the position instruction value is such that the movement distance is long, the proportional gain is set low.

As a result, in the control object machine using this machine control device 45, the position control performance can be improved while suppressing arm vibration phenomena arising from a high proportional gain.

FIG. 5 is a circuit configuration diagram of a machine control device, showing a fifth embodiment of the invention; portions which have the same functions as in the machine control device shown in FIG. 1 are assigned the same symbols.

That is, the machine control device 46 shown in FIG. 5 is different from the machine control device 40 in that, in place of the correction unit 25, a correction unit 33 is comprised, and in addition an adder 34 is comprised, and the adder 26 is omitted.

In the correction unit 33, the third derivative value of the velocity instruction value which is the output of the position regulator 41 is multiplied by a prescribed gain to determine a correction amount, this correction amount is added to a torque instruction value which is the output of the velocity regulator 41 by the adder 34, and this addition value is sent to the torque regulator 23 as a new torque instruction value.

That is, in the machine control device 46 shown in FIG. 5, the transfer function based on the above-described correction unit 33 and adder 34 acts so as to cancel the vibration element component of the transfer function derived from the spring constant of the arm 12 and the weight of the heavy article 11, so that the above-described vibration phenomena of the control object machine are suppressed.

Further, in the proportional gain setting unit 42, when the movement velocity of the sliding movement portion 13 (see FIG. 20) based on the position instruction value from the position instruction unit 24 is slow, that is, when the position instruction value is such that the movement distance is short, the proportional gain of the position regulator 41 is set high, and when the movement velocity based on the position instruction value is fast, that is, when the position instruction value is such that the movement distance is long, the proportional gain is set low.

As a result, in the control object machine using this machine control device 46, the position control performance can be improved while suppressing arm vibration phenomena arising from a high proportional gain.

FIG. 6 is a circuit configuration diagram of a machine control device, showing a sixth embodiment of the invention; portions which have the same functions as in the machine control device shown in FIG. 1 are assigned the same symbols.

That is, the machine control device 47 shown in FIG. 6 is different from the machine control device 40 in that, in place of the correction unit 25, a correction unit 35 is comprised, and in addition an adder 34 is comprised, and the adder 26 is omitted.

In the correction unit 35, the second derivative value of the torque instruction value which is the output of the velocity regulator 22 is multiplied by a prescribed gain to determine a correction amount, this correction amount is added to the torque instruction value by the adder 34, and this addition value is sent to the torque regulator 23 as a new torque instruction value.

That is, in the machine control device 47 shown in FIG. 6, the transfer function based on the above-described correction unit 35 and adder 34 acts so as to cancel the vibration element component of the transfer function derived from the spring constant of the arm 12 and the weight of the heavy article 11, so that the above-described vibration phenomena of the control object machine are suppressed.

Further, in the proportional gain setting unit 42, when the movement velocity of the sliding movement portion 13 (see FIG. 20) based on the position instruction value from the position instruction unit 24 is slow, that is, when the position instruction value is such that the movement distance is short, the proportional gain of the position regulator 41 is set high, and when the movement velocity based on the position instruction value is fast, that is, when the position instruction value is such that the movement distance is long, the proportional gain is set low.

As a result, in the control object machine using this machine control device 47, the position control performance can be improved while suppressing arm vibration phenomena arising from a high proportional gain.

Figure 7:
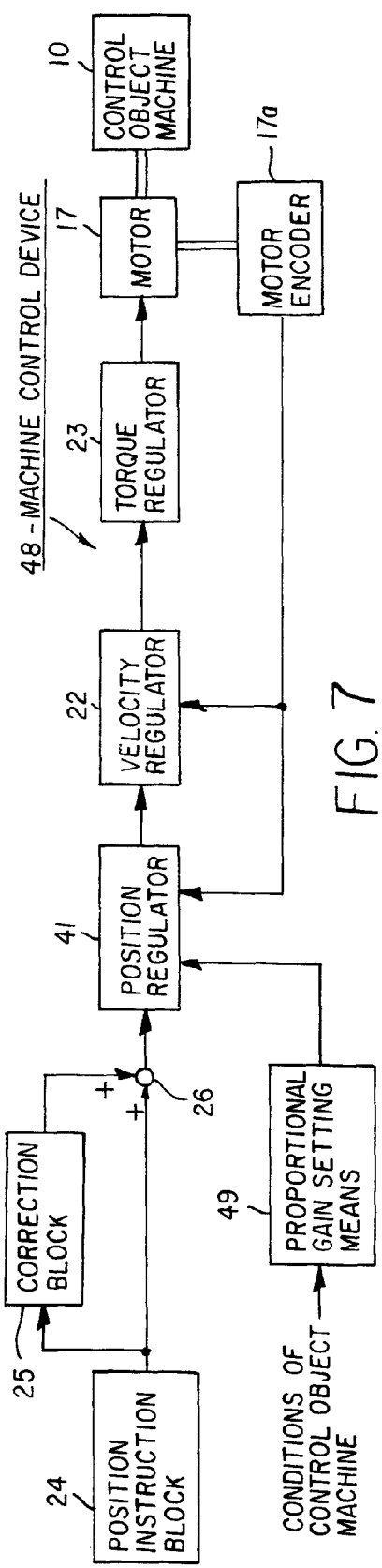
FIG. 7 is a circuit configuration diagram of a machine control device, showing a seventh embodiment of the invention.

FIG. 7 is a circuit configuration diagram of a machine control device, showing a seventh embodiment of the invention; portions which have the same functions as in the machine control device shown in FIG. 1 are assigned the same symbols.

That is, the machine control device 48 shown in FIG. 7 is different from the machine control device 40 in that, in place of the proportional gain setting unit 42, a proportional gain setting unit 49 is comprised.

In the proportional gain setting unit 49, when conditions are such that abrupt disturbing torques occur in the control object machine, the proportional gain of the position regulator 41 is set low, and when conditions are such that abrupt disturbing torques do not occur in the control object machine, the proportional gain is set high.

For example, in cases in which abrupt disturbing torques occur in the control object machine, "1" is input to the proportional gain setting unit 49 from outside as the machine conditions, and the proportional gain of the position regulator 41 is set low; conversely, in cases in which abrupt disturbing torques do not occur in the control object machine, "0" is input to the proportional gain setting unit 49 from outside as the machine conditions, and the proportional gain of the position regulator 41 is set high.

As a result, in the control object machine using this machine control device 48, the position control performance can be improved while suppressing arm vibration phenomena arising from abrupt disturbing torques in the control object machine.

Figure 8:
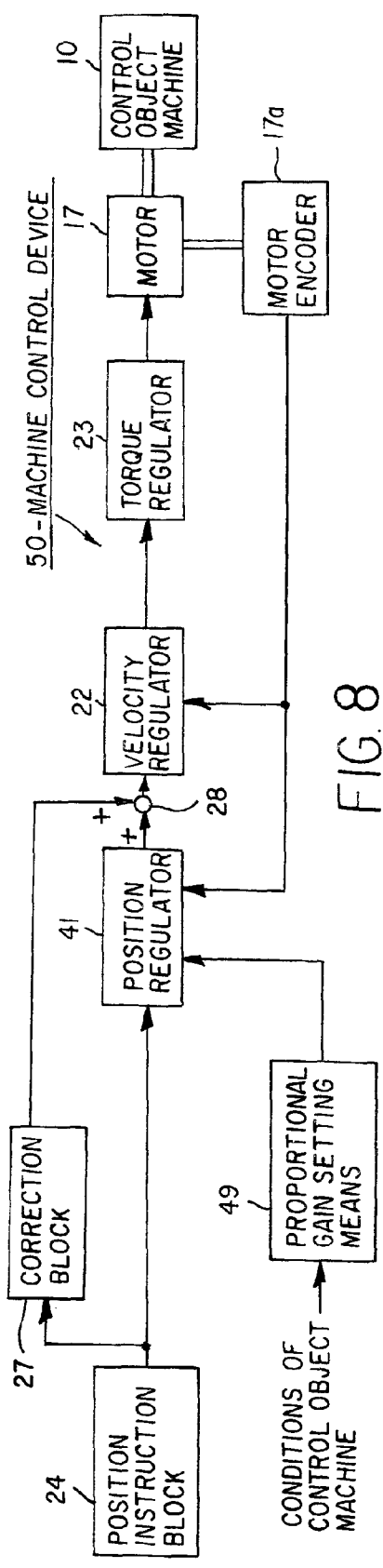
FIG. 8 is a circuit configuration diagram of a machine control device, showing an eighth embodiment of the invention.

FIG. 8 is a circuit configuration diagram of a machine control device, showing an eighth embodiment of the invention; portions which have the same functions as in the machine control device shown in FIG. 2 are assigned the same symbols.

That is, the machine control device 50 shown in FIG. 8 is different from the machine control device 43 in that, in place of the proportional gain setting unit 42, a proportional gain setting unit 49 is comprised.

In the proportional gain setting unit 49, when conditions are such that abrupt disturbing torques occur in the control object machine, the proportional gain of the position regulator 41 is set low, and when conditions are such that abrupt disturbing torques do not occur in the control object machine, the proportional gain is set high.

As a result, in the control object machine using this machine control device 50, the position control performance can be improved while suppressing arm vibration phenomena arising from abrupt disturbing torques in the control object machine.

FIG. 9 is a circuit configuration diagram of a machine control device, showing a ninth embodiment of the invention; portions which have the same functions as in the machine control device shown in FIG. 3 are assigned the same symbols.

That is, the machine control device 51 shown in FIG. 9 is different from the machine control device 44 in that, in place of the proportional gain setting unit 42, a proportional gain setting unit 49 is comprised.

In the proportional gain setting unit 49, when conditions are such that abrupt disturbing torques occur in the control object machine, the proportional gain of the position regulator 41 is set low, and when conditions are such that abrupt disturbing torques do not occur in the control object machine, the proportional gain is set high.

As a result, in the control object machine using this machine control device 51, the position control performance can be improved while suppressing arm vibration phenomena arising from abrupt disturbing torques in the control object machine.

FIG. 10 is a circuit configuration diagram of a machine control device, showing a tenth embodiment of the invention; portions which have the same functions as in the machine control device shown in FIG. 4 are assigned the same symbols.

That is, the machine control device 52 shown in FIG. 10 is different from the machine control device 45 in that, in place of the proportional gain setting unit 42, a proportional gain setting unit 49 is comprised.

In the proportional gain setting unit 49, when conditions are such that abrupt disturbing torques occur in the control object machine, the proportional gain of the position regulator 41 is set low, and when conditions are such that abrupt disturbing torques do not occur in the control object machine, the proportional gain is set high.

As a result, in the control object machine using this machine control device 52, the position control performance can be improved while suppressing arm vibration phenomena arising from abrupt disturbing torques in the control object machine.

Figure 11:
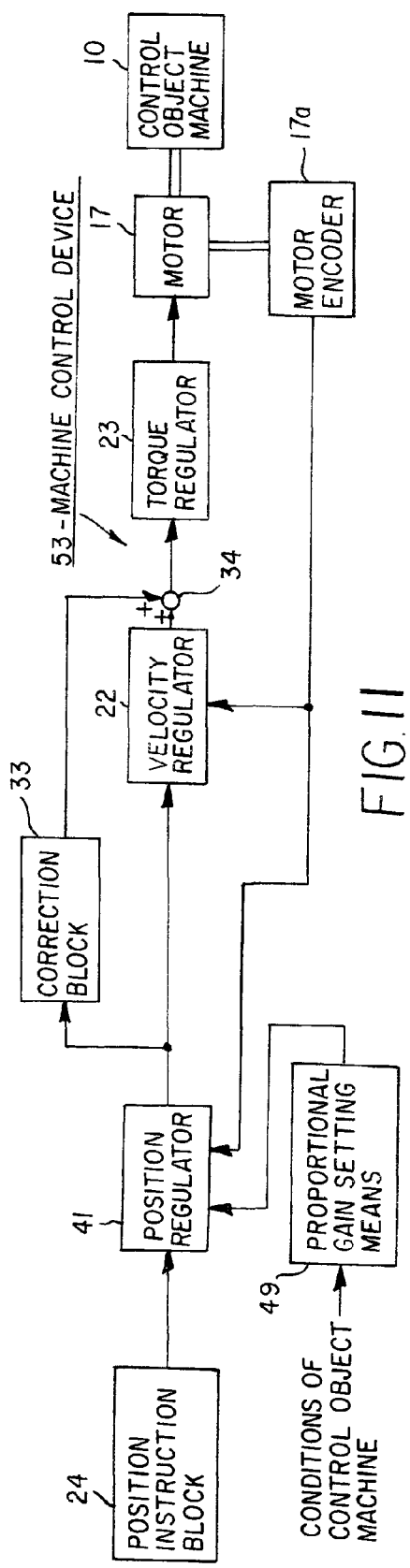
FIG. 11 is a circuit configuration diagram of a machine control device, showing an eleventh embodiment of the invention.

FIG. 11 is a circuit configuration diagram of a machine control device, showing an eleventh embodiment of the invention; portions which have the same functions as in the machine control device shown in FIG. 5 are assigned the same symbols.

That is, the machine control device 53 shown in FIG. 11 is different from the machine control device 46 in that, in place of the proportional gain setting unit 42, a proportional gain setting unit 49 is comprised.

In the proportional gain setting unit 49, when conditions are such that abrupt disturbing torques occur in the control object machine, the proportional gain of the position regulator 41 is set low, and when conditions are such that abrupt disturbing torques do not occur in the control object machine, the proportional gain is set high.

As a result, in the control object machine using this machine control device 53, the position control performance can be improved while suppressing arm vibration phenomena arising from abrupt disturbing torques in the control object machine.

Figure 12:
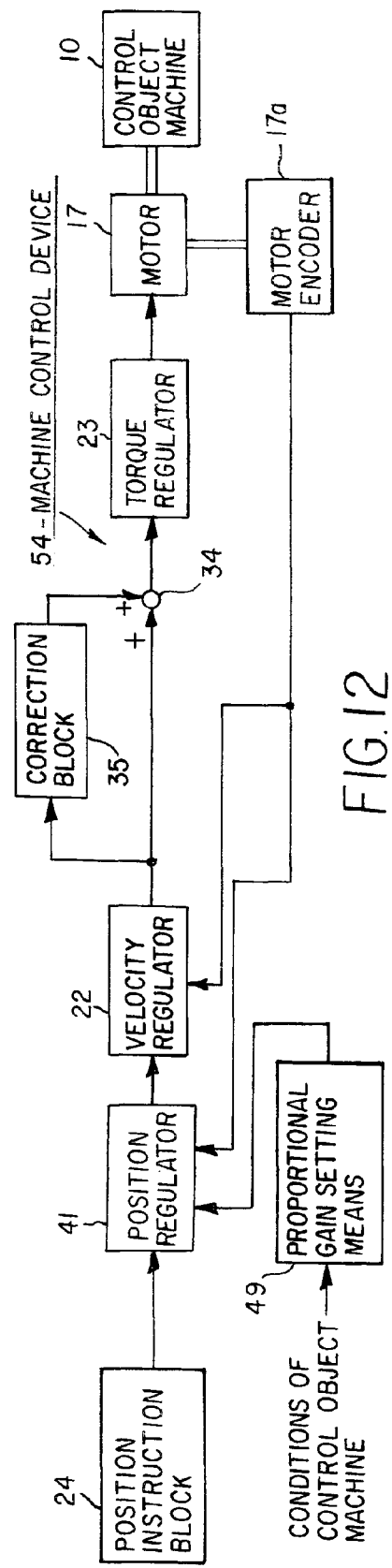
FIG. 12 is a circuit configuration diagram of a machine control device, showing a twelfth embodiment of the invention.

FIG. 12 is a circuit configuration diagram of a machine control device, showing a twelfth embodiment of the invention; portions which have the same functions as in the machine control device shown in FIG. 6 are assigned the same symbols.

That is, the machine control device 54 shown in FIG. 12 is different from the machine control device 47 in that, in place of the proportional gain setting unit 42, a proportional gain setting unit 49 is comprised.

In the proportional gain setting unit 49, when conditions are such that abrupt disturbing torques occur in the control object machine, the proportional gain of the position regulator 41 is set low, and when conditions are such that abrupt disturbing torques do not occur in the control object machine, the proportional gain is set high.

As a result, in the control object machine using this machine control device 54, the position control performance can be improved while suppressing arm vibration phenomena arising from abrupt disturbing torques in the control object machine.

Figure 13:
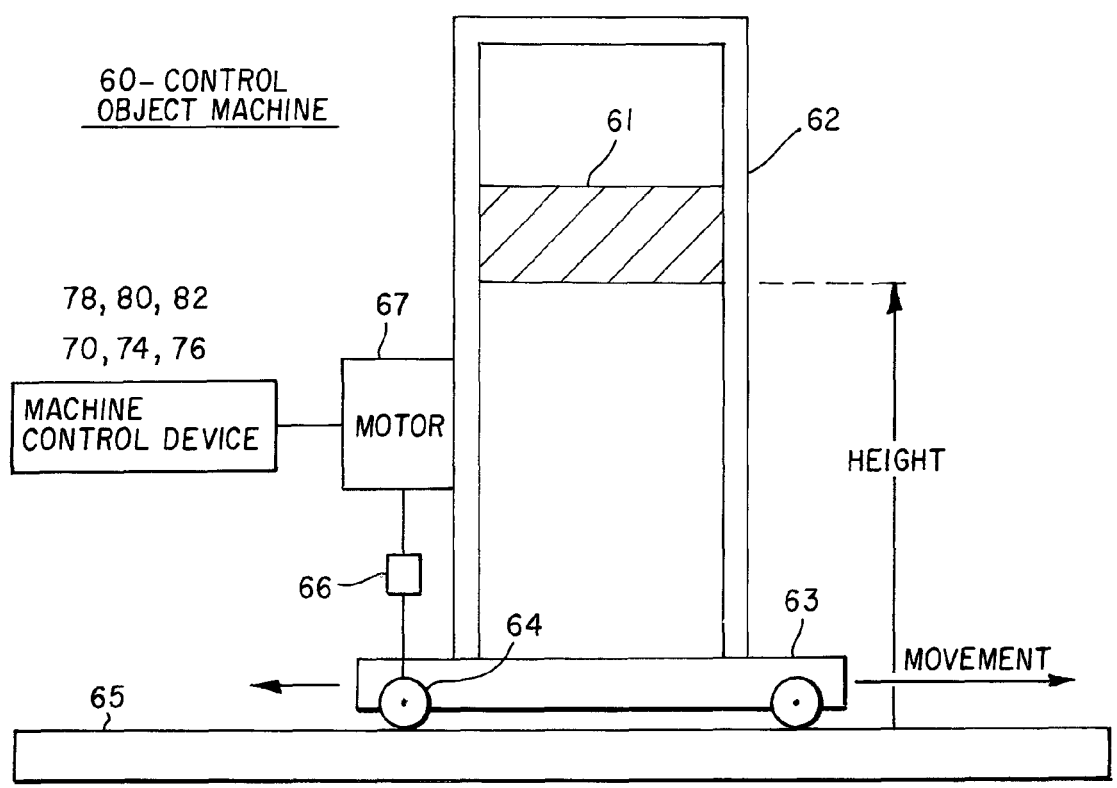
FIG. 13 is a schematic conceptual diagram of a control object machine.
Figure 20:
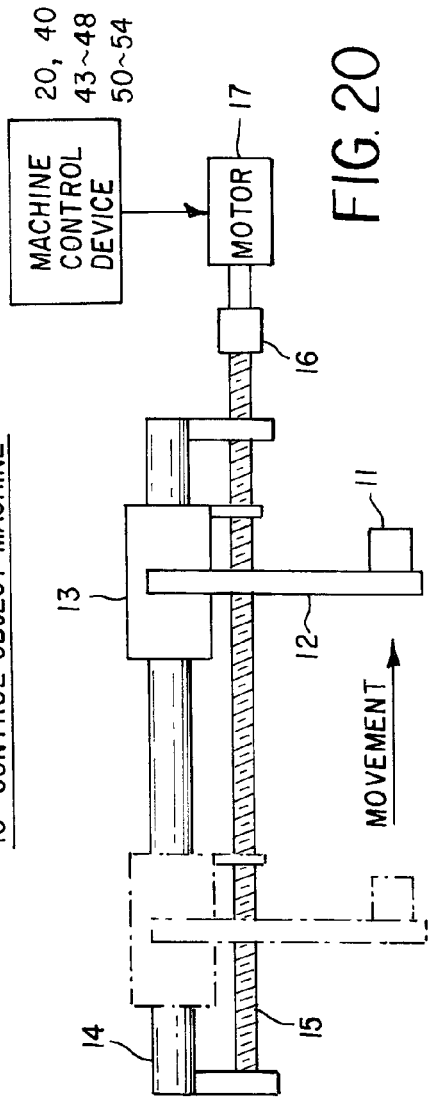
FIG. 20 is a schematic conceptual diagram of a control object machine.

FIG. 13 is a schematic conceptual diagram of a control object machine different from that of the above FIG. 20.

This machine 60 comprises a heavy article 61, gate-shaped arm 62, dolly 63, wheels 64, rail 65, coupling 66, motor 67, and any one of the machine control devices 70, 74, 76, 78, 80, and 82. Of these, the control object machine comprises the heavy article 61, gate-shaped arm 62, dolly 63, wheels 64, rail 65, and coupling 66. This control object machine is used in equipment to transport goods in a multilevel warehouse and in other applications.

In FIG. 13, the dolly 63 is designed to be able to move smoothly on the rail 65 via the wheels 64 in the left-right directions of motion in the figure. The output shaft of the motor 67 is connected via the coupling 66 to wheels 64. That is, the dolly 63 moves in the left and right directions in the figure through rotational driving of wheels 64 by the motor 67 via the coupling 66, according to position control operation of the machine control device.

The gate-shaped arm 62 is mounted on the dolly 63 the position of which is controlled in this manner; on this gate-shaped arm 62 is mounted a heavy article 61, of which the height position from the rail 65, shown in the figure, can be varied. Hence by unit of position control of the dolly 63, the position of the heavy article 61 supported by the gate-shaped arm 62 can also be controlled.

For the configuration shown in FIG. 13, it is known that even when the dolly 63 has halted at a target position, the heavy article 61 mounted on the gate-shaped arm 62 causes the gate-shaped arm 62 to flex due to its own inertial force, advancing past the instruction position, so that even after the dolly 63 has halted at the target position, there are cases in which halting is not immediate and vibration may occur.

The motor 17 and machine 10 in the machine control devices shown in FIG. 1 to FIG. 12 can be taken to be the motor 67 and machine 60 in the configuration shown in FIG. 13.

When the embodiments shown in the above FIG. 7 to FIG. 12 are applied to the control object machine shown in FIG. 13, as conditions in which abrupt disturbing torques may occur in the control object machine, for example when the dolly 63 travels on the rail 65 having joints, the shock occurring when the dolly 63 passes over a joint in the rail 65 may cause abrupt disturbing torques on the control object machine.

In such a case, when for example there are joints in the rail 65, "1" is input to the proportional gain setting unit 49 from outside as the conditions of the machine, and the proportional gain of the position regulator 41 is set low; conversely, when for example there are no joints in the rail 65, "0" is input to the proportional gain setting unit 49 from outside as the conditions of this machine, and the proportional gain of the position regulator 41 is set high.

Alternatively, information on the positions of joints in the rail 65 may be set in advance, and based on position information from the motor encoder 17a, the proportional gain of the position regulator 41 may be set low when the dolly 63 passes over joints in the rail 65.

Figure 14:
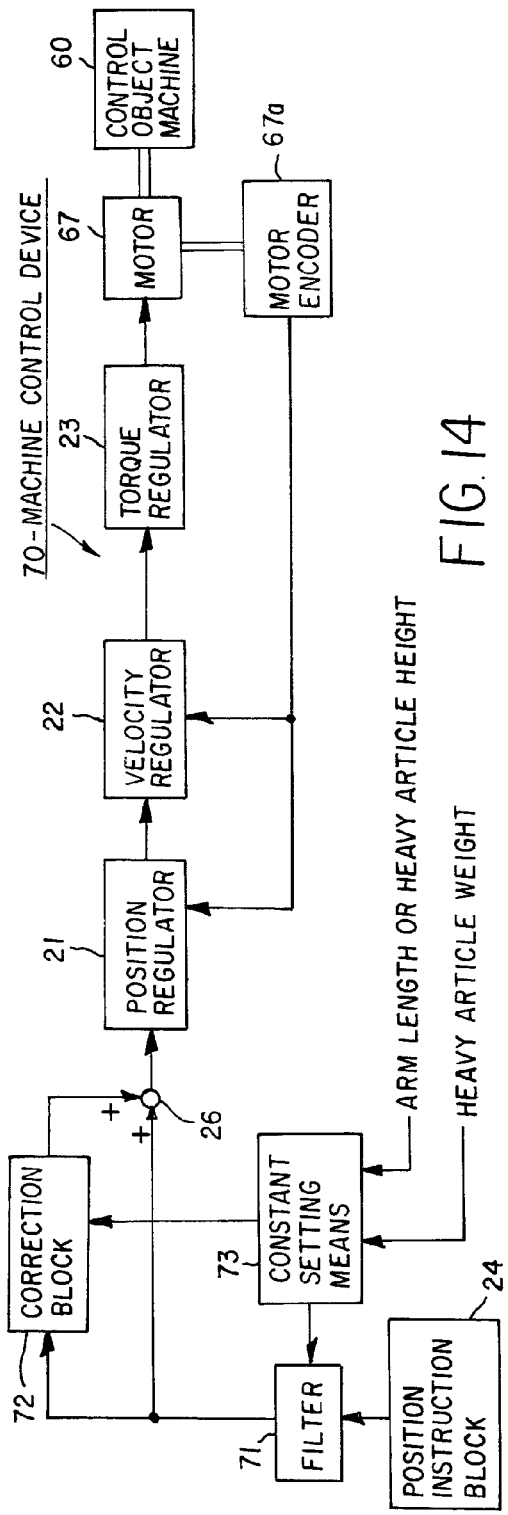
FIG. 14 is a circuit configuration diagram of a machine control device, showing a thirteenth embodiment of the invention.

FIG. 14 is a circuit configuration diagram of a machine control device, showing a thirteenth embodiment of the invention comprising the above-described function to suppress vibration phenomena; portions which have the same functions as in the machine control device shown in FIG. 21 are assigned the same symbols.

That is, the machine control device 70 shown in FIG. 14 is different from the machine control device 20 of the prior art in that a filter 71 is added which performs filter processing of position instruction values output by the position instruction unit 24, and in place of a correction unit 25 with a fixed correction gain which takes values output from this filter 71 as new position instruction values, a correction unit 72 is comprised which enables variation of the correction gain, while employing a correction amount derivation method similar to that of the correction unit 25; in addition, constant setting unit 73, which issues instructions for the filter time constant in the filter 71 and for the correction gain in the correction unit 72, is comprised.

In this constant setting unit 73, when the weight of the heavy article 61 mounted on the control object machine is greater than a prescribed value, and moreover the heavy article 61 is at a high position, the time constant of the filter 71 is set high and the correction gain of the correction unit 72 is set high; and when the weight of the heavy article 61 is smaller than the prescribed value or the heavy article 61 is at a low position, the time constant of the filter 71 is set low and the correction gain of the correction unit 72 is set low.

Because the correction gain of the correction unit 72 is proportional to the reciprocal of the square of the vibration frequency, when the arm is long or when the heavy article is at a high position, the vibration frequency is low, and so the correction gain of the correction unit 72 is high.

As a result, in a control object machine using this machine control device 70, the filter 71 performs filter processing of a position instruction value output from the position instruction unit 24, and by taking this as a new position instruction value, measures are taken to gradually increase or decrease the new position instruction value under conditions in which the above-described vibration phenomena occur, and in addition the correction gain of the correction unit 72 is set high, and vibration phenomena are suppressed.

Conversely, under conditions in which the vibration phenomena do not readily occur, measures are taken to rapidly increase or decrease the new position instruction value, and in addition the correction gain of the correction unit 72 is set low, and vibration phenomena are suppressed.

Figure 15:
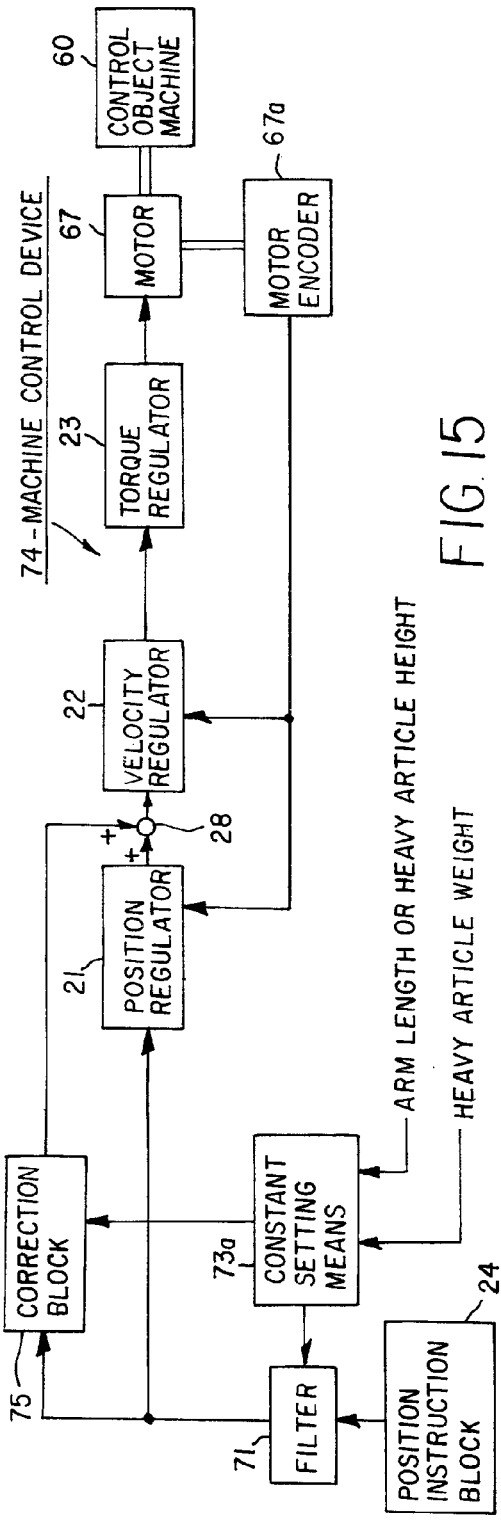
FIG. 15 is a circuit configuration diagram of a machine control device, showing a fourteenth embodiment of the invention.

FIG. 15 is a circuit configuration diagram of a machine control device, showing a fourteenth embodiment of the invention; portions which have the same functions as in the machine control device shown in FIG. 14 are assigned the same symbols.

That is, the machine control device 74 shown in FIG. 15 is different from the machine control device 70 in that, in place of the correction unit 72, a correction unit 75 is comprised which enables variation of the correction gain, while employing a correction amount derivation method similar to that of the correction unit 27; in addition, an adder 28 is comprised, and the adder 26 is omitted.

In the constant setting unit 73a shown in FIG. 15, when the weight of the heavy article 61 mounted on the control object machine is greater than a prescribed value, and moreover the heavy article 61 is at a high position, the time constant of the filter 71 is set high and the correction gain of the correction unit 75 is set high; and when the weight of the heavy article 61 is smaller than the prescribed value or the heavy article 61 is at a low position, the time constant of the filter 71 is set low and the correction gain of the correction unit 75 is set low.

As a result, in a control object machine using this machine control device 74, the filter 71 performs filter processing of a position instruction value output from the position instruction unit 24, and by taking this as a new position instruction value, measures are taken to gradually increase or decrease the new position instruction value under conditions in which the above-described vibration phenomena occur, and in addition the correction gain of the correction unit 75 is set high, and vibration phenomena are suppressed.

Conversely, under conditions in which vibration phenomena do not readily occur, measures are taken to rapidly increase or decrease the new position instruction value, and in addition the correction gain of the correction unit 75 is set low, and vibration phenomena are suppressed.

FIG. 16 is a circuit configuration diagram of a machine control device, showing a fifteenth embodiment of the invention comprising the above-described function to suppress vibration phenomena; portions which have the same functions as in the machine control device shown in FIG. 14 are assigned the same symbols.

That is, the machine control device 76 shown in FIG. 16 is different from the machine control device 70 in that, in place of the correction unit 72, a correction unit 77 is comprised which enables variation of the correction gain, while employing a correction amount derivation method similar to that of the correction unit 29; in addition, an adder 30 is comprised, and the adder 26 is omitted.

In the constant setting unit 73b shown in FIG. 16, when the weight of the heavy article 61 mounted on the control object machine is greater than a prescribed value, and moreover the heavy article 61 is at a high position, the time constant of the filter 71 is set high and the correction gain of the correction unit 77 is set high; and when the weight of the heavy article 61 is smaller than the prescribed value or the heavy article 61 is at a low position, the time constant of the filter 71 is set low and the correction gain of the correction unit 77 is set low.

As a result, in a control object machine using this machine control device 76, the filter 71 performs filter processing of a position instruction value output from the position instruction unit 24, and by taking this as a new position instruction value, measures are taken to gradually increase or decrease the new position instruction value under conditions in which the above-described vibration phenomena occur, and in addition the correction gain of the correction unit 77 is set high, and vibration phenomena are suppressed.

Conversely, under conditions in which vibration phenomena do not readily occur, measures are taken to rapidly increase or decrease the new position instruction value, and in addition the correction gain of the correction unit 77 is set low, and vibration phenomena are suppressed.

FIG. 17 is a circuit configuration diagram of a machine control device, showing a sixteenth embodiment of the invention; portions which have the same functions as in the machine control device shown in FIG. 14 are assigned the same symbols.

That is, the machine control device 78 shown in FIG. 17 is different from the machine control device 70 in that, in place of the correction unit 72, a correction unit 79 is comprised which enables variation of the correction gain, while employing a correction amount derivation method similar to that of the correction unit 31; in addition, an adder 32 is comprised, and the adder 26 is omitted.

In the constant setting unit 73c shown in FIG. 17, when the weight of the heavy article 61 mounted on the control object machine is greater than a prescribed value, and moreover the heavy article 61 is at a high position, the time constant of the filter 71 is set high and the correction gain of the correction unit 79 is set high; and when the weight of the heavy article 61 is smaller than the prescribed value or the heavy article 61 is at a low position, the time constant of the filter 71 is set low and the correction gain of the correction unit 79 is set low.

As a result, in a control object machine using this machine control device 78, the filter 71 performs filter processing of a position instruction value output from the position instruction unit 24, and by taking this as a new position instruction value, measures are taken to gradually increase or decrease the new position instruction value under conditions in which the above-described vibration phenomena occur, and in addition the correction gain of the correction unit 79 is set high, and vibration phenomena are suppressed.

Conversely, under conditions in which vibration phenomena do not readily occur, measures are taken to rapidly increase or decrease the new position instruction value, and in addition the correction gain of the correction unit 79 is set low, and vibration phenomena are suppressed.

Figure 18:
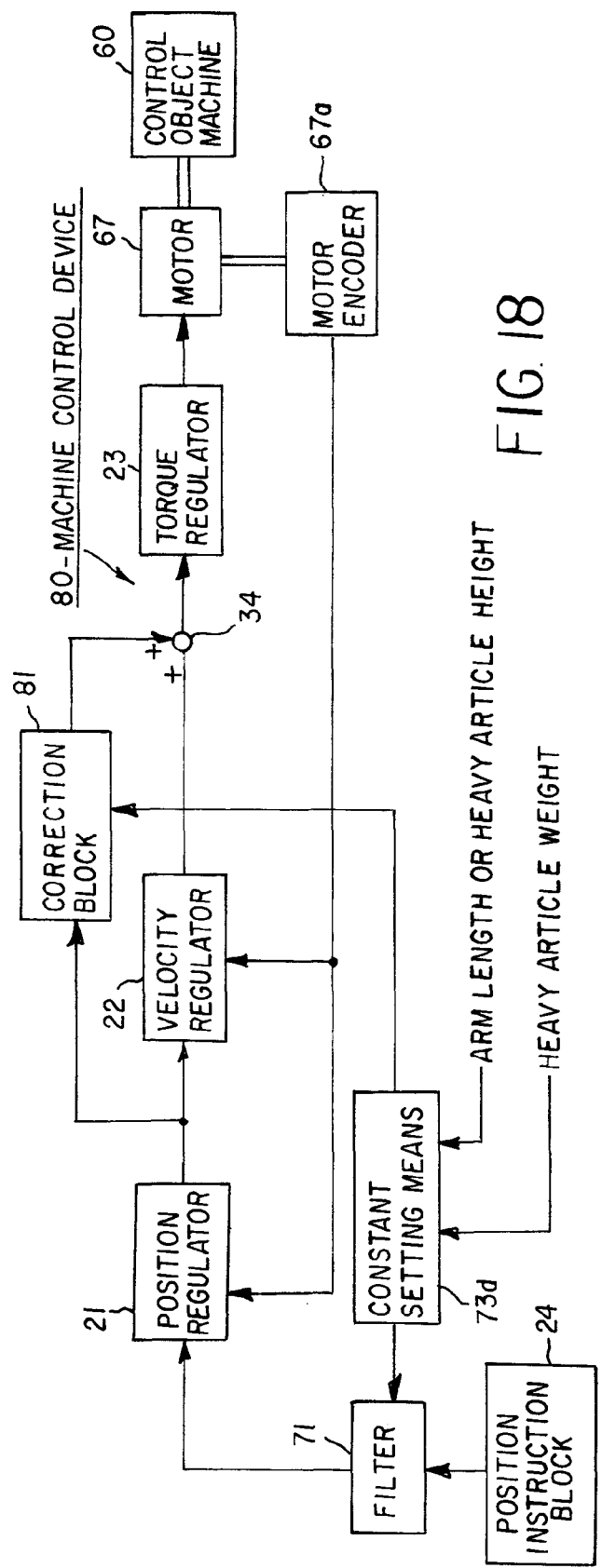
FIG. 18 is a circuit configuration diagram of a machine control device, showing a seventeenth embodiment of the invention.

FIG. 18 is a circuit configuration diagram of a machine control device, showing a seventeenth embodiment of the invention; portions which have the same functions as in the machine control device shown in FIG. 14 are assigned the same symbols.

That is, the machine control device 80 shown in FIG. 18 is different from the machine control device 70 in that, in place of the correction unit 72, a correction unit 81 is comprised which enables variation of the correction gain, while employing a correction amount derivation method similar to that of the correction unit 33; in addition, an adder 34 is comprised, and the adder 26 is omitted.

In the constant setting unit 73d shown in FIG. 18, when the weight of the heavy article 61 mounted on the control object machine is greater than a prescribed value, and moreover the heavy article 61 is at a high position, the time constant of the filter 71 is set high and the correction gain of the correction unit 81 is set high; and when the weight of the heavy article 61 is smaller than the prescribed value or the heavy article 61 is at a low position, the time constant of the filter 71 is set low and the correction gain of the correction unit 81 is set low.

As a result, in a control object machine using this machine control device 80, the filter 71 performs filter processing of a position instruction value output from the position instruction unit 24, and by taking this as a new position instruction value, measures are taken to gradually increase or decrease the new position instruction value under conditions in which the above-described vibration phenomena occur, and in addition the correction gain of the correction unit 81 is set high, and vibration phenomena are suppressed.

Conversely, under conditions in which vibration phenomena do not readily occur, measures are taken to rapidly increase or decrease the new position instruction value, and in addition the correction gain of the correction unit 81 is set low, and vibration phenomena are suppressed.

Figure 19:
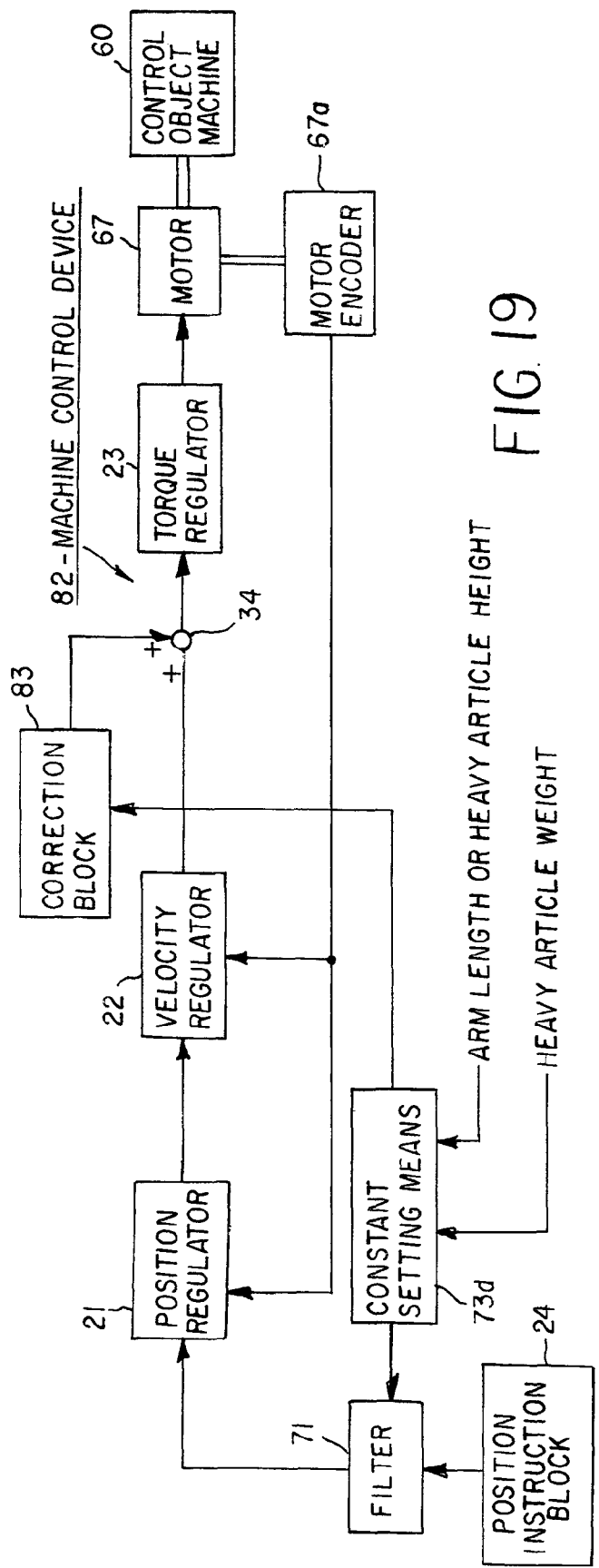
FIG. 19 is a circuit configuration diagram of a machine control device, showing an eighteenth embodiment of the invention.

FIG. 19 is a circuit configuration diagram of a machine control device, showing an eighteenth embodiment of the invention; portions which have the same functions as in the machine control device shown in FIG. 14 are assigned the same symbols.

That is, the machine control device 82 shown in FIG. 19 is different from the machine control device 70 in that, in place of the correction unit 72, a correction unit 83 is comprised which enables variation of the correction gain, while employing a correction amount derivation method similar to that of the correction unit 35; in addition, an adder 34 is comprised, and the adder 26 is omitted.

In the constant setting unit 73d shown in FIG. 19, when the weight of the heavy article 61 mounted on the control object machine is greater than a prescribed value, and moreover the heavy article 61 is at a high position, the time constant of the filter 71 is set high and the correction gain of the correction unit 83 is set high; and when the weight of the heavy article 61 is smaller than the prescribed value or the heavy article 61 is at a low position, the time constant of the filter 71 is set low and the correction gain of the correction unit 83 is set low.

As a result, in a control object machine using this machine control device 82, the filter 71 performs filter processing of a position instruction value output from the position instruction unit 24, and by taking this as a new position instruction value, measures are taken to gradually increase or decrease the new position instruction value under conditions in which the above-described vibration phenomena occur, and in addition the correction gain of the correction unit 83 is set high, and vibration phenomena are suppressed.

Conversely, under conditions in which vibration phenomena do not readily occur, measures are taken to rapidly increase or decrease the new position instruction value, and in addition the correction gain of the correction unit 83 is set low, and vibration phenomena are suppressed.

In the machine control devices shown in FIG. 14 to FIG. 19, explanations were given for the motor 67 and control object machine 60 in the configuration shown in FIG. 13; however, the motor 67 and control object machine 60 in the explanations of machine control devices in FIG. 14 to FIG. 19 may be replaced with the motor 17 and control object machine 10 in the configuration shown in FIG. 20.

In this case, in the constant setting unit 73, when the weight of the heavy article mounted on the control object machine is greater than a prescribed value, and moreover the arm 12 is long, the time constant of the filter 71 is set high and the correction gain of the correction unit is set high; and when the arm 12 is short, the time constant of the filter 71 is set low and the correction gain of the correction unit is set low.

The invention has been described with reference to certain preferred embodiments thereof. It will be understood, however, that modifications and variations are possible within the scope of the appended claims.

What is claimed is:

1. A machine control device for moving a control object machine to a target position and halting the control object machine, the machine control device comprising:
  a correction unit that obtains a correction amount, based on an instruction value for any one of position, velocity and torque, from an nth derivative value (where n is a natural number equal to or greater than 2) of the instruction value;
  an addition unit that adds the correction amount to an instruction value for any one of position, velocity and torque;
  a control unit for driving and controlling the control object machine according to output of the addition unit; and
  a proportional gain setting unit that sets a proportional gain upon position regulation operation;
  wherein, in the proportional gain setting unit, when a movement velocity based on the position instruction value decreases the proportional gain is set high, and when a movement velocity based on the position instruction value increases, the proportional gain is set low.

2. A machine control device for moving a control object machine to a target position and halting the control object machine, the machine control device comprising:
  a correction unit that obtains a correction amount, based on an instruction value for any one of position, velocity and torque, from an nth derivative value (where n is a natural number equal to or greater than 2) of the instruction value;
  an addition unit that adds the correction amount to an instruction value for any one of position, velocity and torque;
  a control unit for driving and controlling the control object machine according to output of the addition unit; and
  a proportional gain setting unit that sets a proportional gain upon position regulation operation;
  wherein, in the proportional gain setting unit, under conditions where abrupt disturbing torques occur to the control object machine, proportional gain is set low, and under conditions where abrupt disturbing torques do not occur to the control object machine the proportional gain is set high.

3. A machine control device for moving a control object machine to a target position and halting the control object machine, the machine control device comprising:
  a correction unit that obtains a correction amount, based on an instruction value for any one of position, velocity and torque, from an nth derivative value (where n is a natural number equal to or greater than 2) of the instruction value;
  an addition unit for adding the correction amount to an instruction value for any one of position, velocity and torque;
  a control unit for driving and controlling the control object machine according to output of the addition unit;
  a filter that performs filter processing to a position instruction value, wherein the output value from the filter is taken as a new position instruction value, and a constant setting unit that sets a time constant of the filter and a correction gain of the correction unit;

wherein, in the constant settings unit, when the weight of a heavy article mounted on the control object machine is greater than a prescribed value and the length of an arm supporting the heavy article is greater than a prescribed value or the heavy article is at a high position, the time constant of the filter is set high, and when the weight of the heavy article is smaller than the prescribed value and the length of the arm supporting the heavy article is smaller than a prescribed value or the heavy article is at a low position, the time constant of the filter is set low.

4. A machine control device for moving a control object machine to a target position and halting the control object machine, the machine control device comprising:

a correction unit that obtains a correction amount, based on an instruction value for any one of position, velocity and torque, from an nth derivative value (where n is a natural number equal to or greater than 2) of the instruction value;

an addition unit for adding the correction amount to an instruction value for any one of position, velocity and torque;

a control unit for driving and controlling the control object machine according to output of the addition unit;

a filter that performs filter processing to a position instruction value, wherein the output value from the filter is taken as a new position instruction value, and a constant setting unit that sets a time constant of the filter and a correction gain of the correction unit;

wherein, in the constant settings unit, when the weight of a heavy article mounted on the control object is greater than a prescribed value and the length of an arm supporting the heavy object is greater than a prescribed value or the heavy article is at a high position, the correction gain of the correction unit is set high, and when the weight of the heavy article is smaller than the prescribed value and the length of the arm supporting the heavy article is smaller than a prescribed value or the heavy article is at a low position, the correction gain of the correction unit is set low.

* * * * *